United States Patent
Allhusen et al.

(10) Patent No.: US 7,289,996 B2
(45) Date of Patent: Oct. 30, 2007

(54) DATA TRANSMISSION MANAGEMENT

(75) Inventors: Eric J. Allhusen, New York, NY (US);
Stephen P. Beever, Lake Forest, CA (US); Jeffrey M. Farley, Tucson, AZ (US); Stephen G. Perun, Appling, GA (US); Scott W. Weller, Penfield, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/937,197

(22) Filed: Sep. 9, 2004

(65) Prior Publication Data
US 2006/0053146 A1 Mar. 9, 2006

(51) Int. Cl.
*G06F 17/30* (2006.01)
(52) U.S. Cl. .......................... 707/10; 707/100; 725/98
(58) Field of Classification Search .................. 707/10, 707/100, 101; 725/97, 98
See application file for complete search history.

(56) References Cited

U.S. PATENT DOCUMENTS

| | | | |
|---|---|---|---|
| 5,404,505 A * | 4/1995 | Levinson ...................... | 707/10 |
| 6,335,922 B1 * | 1/2002 | Tiedemann et al. ......... | 370/335 |
| 6,738,972 B1 * | 5/2004 | Willard et al. .............. | 718/103 |
| 7,006,466 B2 * | 2/2006 | Borst et al. ................. | 370/329 |
| 2002/0199200 A1 * | 12/2002 | Addington .................... | 725/97 |

* cited by examiner

*Primary Examiner*—CamLinh Nguyen
(74) *Attorney, Agent, or Firm*—Schmeiser, Olsen & Watts; John R. Pivnichny

(57) ABSTRACT

A system and method to schedule data for transmission. The system comprises data generating means, developing means, and transmission scheduling means. The data generating means generates data comprising content data and metadata relating to the content data. The developing means develops a set of input data. The transmission scheduling means produces a continuously updating schedule for transmission of copies of the content data based on the metadata and the set of input data.

24 Claims, 4 Drawing Sheets

DATA TRANSMISSION MANAGEMENT

BACKGROUND OF THE INVENTION

1. Technical Field

The present invention relates to system and method to schedule data for transmission.

2. Related Art

Delivering an electronic communication to devices that do not provide feedback to verify that the electronic communication has been received by the devices may be inefficient because excessive deliveries of the electronic communication may be required to ensure the electronic communication has been received by the devices. Therefore there is a need to provide an efficient way to deliver an electronic communication to devices that do not provide feedback to verify that the electronic communication has been received.

SUMMARY OF THE INVENTION

The present invention provides a system, comprising:

data generating means for generating data comprising content data and metadata relating to the content data;

developing means for developing a set of input data; and transmission scheduling means for producing a continuously updating schedule for transmission of copies of the content data based on the metadata and the set of input data.

The present invention provides a method, comprising:

providing a transmission scheduling means, a set of input data, and data, wherein the data comprises content data and metadata relating to the content data;

producing by the transmission scheduling means, a continuously updating schedule for transmission of copies of the content data based on the metadata and the first set of input data.

The present invention provides a computer program product, comprising:

a computer usable medium having a computer readable program code embodied therein for implementing a method, wherein the computer readable program code comprises a transmission scheduling means adapted to implement the method comprising:

producing a continuously updating schedule for transmission of copies of content data based on metadata relating to the content data and a set of input data, wherein the metadata comprises priority level information for transmission of said copies, and wherein the set of input data comprises target data regarding a target receiving party for said copies.

The present invention provides computer system comprising a processor and a computer readable memory unit coupled to the processor, said memory unit containing instructions that when executed by the processor implement a method for scheduling transmission of content data, said method comprising the computer implemented steps of:

producing a continuously updating schedule for transmission of copies of the content data based on metadata relating to the content data and a set of input data, wherein the metadata comprises priority level information for transmission of said copies, and wherein the set of input data comprises target data regarding a target receiving party for said copies.

The present invention provides advantageously provides a system and associated method to provide an efficient way to deliver an electronic communication to devices that do not provide feedback to verify that the electronic communication has been received.

DETAILED DESCRIPTION OF THE INVENTION

Figure 1:
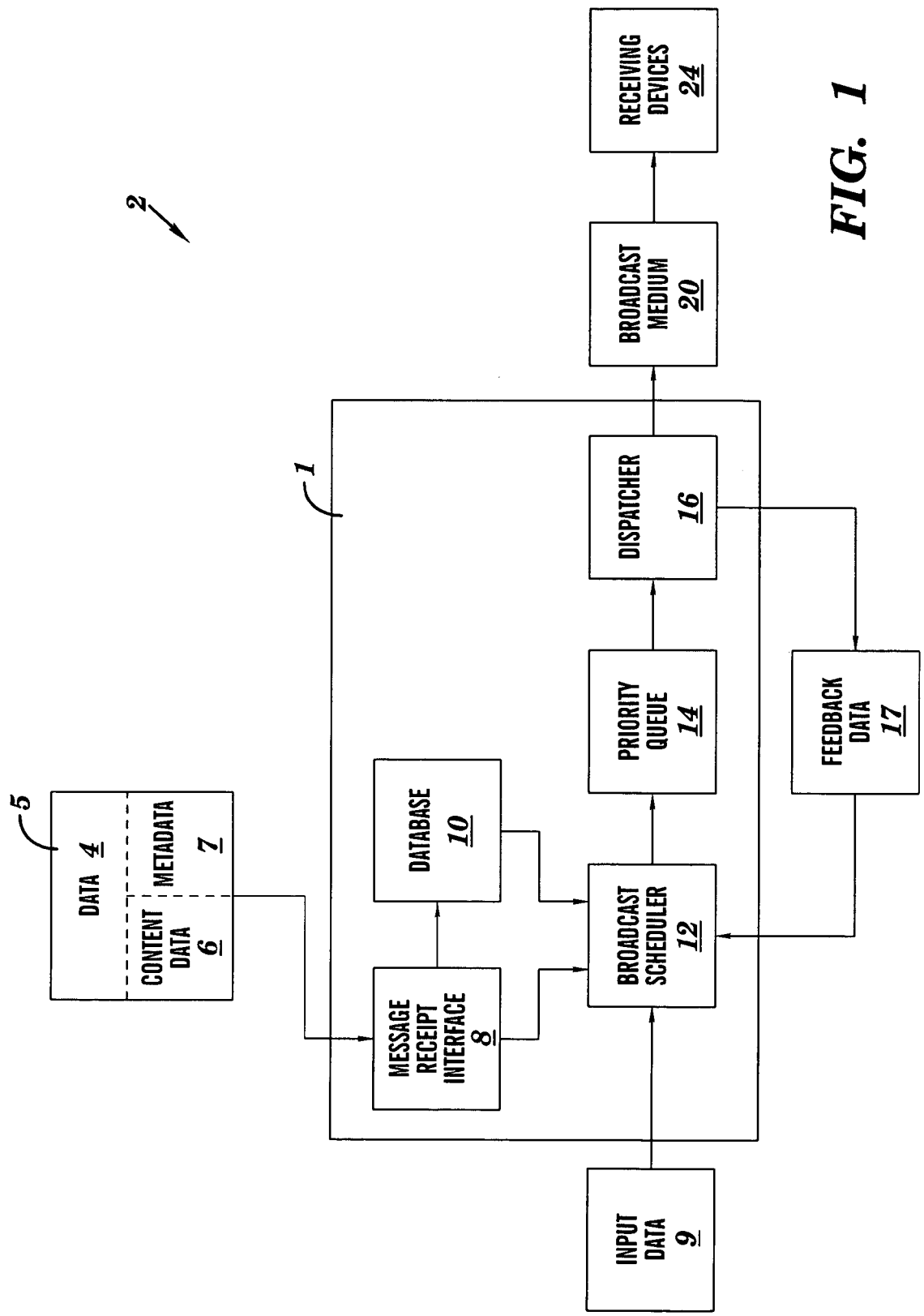
FIG. 1 illustrates a block diagram of a system for scheduling content data for transmission, in accordance with embodiments of the present invention.

FIG. 1 illustrates a block diagram of a system 2 for scheduling content data 6 for transmission, in accordance with embodiments of the present invention. The content data 6 may comprise any type of content data including, inter alia, audio data, video data, a software object (e.g., binary data including, inter alia, audio, video, system configuration data, executable code, etc.), etc. The system 2 is capable of scheduling the content data 6 (e.g., data or message for a radio broadcast) to be transmitted (e.g., broadcast) over an unreliable unidirectional medium 20 (e.g., such as satellite, radio, etc). The medium 20 is unreliable in the sense that receiving devices 24 (e.g., satellite receiver, radio receiver, etc.) may or may not be active (i.e. turned on) at any given time. Furthermore there is no feedback from the receiving devices 24 to specify that the content data 4 has been received. In order to provide a specified quality of service (QoS) level, a transmission (e.g., broadcast) of the content data 6 must be repeated periodically. QoS is defined herein as an effort to provide different levels of saturation for different types of content data 6 delivered over a broadcast medium within a given time interval. Saturation is defined herein as a percentage of recipients (i.e., through receiving devices 24) targeted by a particular content data 6 transmission (i.e., broadcasted message) that will have successfully received the content data 6 transmission (i.e., broadcasted message) in a specified time frame. For example, the system 2 may be set to transmit so that a 99% saturation level is achieved in within 1 week. For illustration purposes QoS levels may be labeled as high, medium, and low. Content data 6 (i.e., messages) requiring a higher QoS level (e.g., high) must be transmitted often, thus giving a higher probability that the content data 6 has been successfully received by the receiving devices 24. In order to provide a QoS level, input data 9 regarding expected usage of the receiving devices 24 may be used as an input to the system 2 to determine how often and when broadcasts (i.e., transmission of the content data 6) should be made. The probability that any given transmitted content data (i.e., content data 6) has been received is used to estimate a current saturation of the transmitted content data (i.e., the probability that the receiving devices 24 have successfully received the transmitted data). Additionally, metadata 7 regarding the content data 6 is used as an input to the system 2 to determine how often and when broadcasts (i.e., transmission of the content data 6) should be made. The system 2 is designed such that various scheduling strategies can be used with different types of content data. The scheduling strategies can use demographic information regarding the targeted receivers of the message (i.e., input data 9), the requested QoS (i.e., metadata 7), the broadcast history (feedback data 7), and other information in order to achieve the requested QoS. Another goal of these strategies may be to optimize the number of broadcasts in order to reduce costs and/or time.

The system 2 comprises a data generator 5, a hardware/software system 1, a broadcast medium 20, and receiving devices 24. The hardware/software system 1 uses various input data (metadata 7, input data 9, feedback data 17, etc) to schedule the content data 6 for transmission. The data generator 5 generates the data 4 comprising the content data 6 (e.g., data or message for a radio broadcast) and metadata 7 and send the content data 6 and metadata 7 the to the hardware/software system 1. The metadata 7 comprises information and/or instructions (e.g., QoS information, content data type, content data priority information, transmission dates for content data, etc) regarding the content data 6. The hardware/software system 1 comprises a message receipt interface 8 comprising hardware and software, a transmission scheduler 12 comprising software, a databases 10, a priority queue 14 comprising hardware and software, and a dispatcher 16 comprising hardware and software. The message receipt interface 8 receives the data 4 comprising the content data 6 (e.g., data or message for a radio broadcast) and metadata 7 from the data generator 5. The metadata 7 additionally comprises a request to schedule the content data 6 (e.g., a message) for transmission to the receiving devices 24. The message receipt interface 8 validates the request to schedule the content data 6 (e.g., a message) for transmission and passes the content data 6 to the database 10. Next, the message receipt interface 8 notifies the transmission scheduler 12 of a new message (i.e., content data 6) to be scheduled for transmission to the receiving device 24. The transmission scheduler 12 retrieves a copy of the content data 6 from the database 10. The overall scheduling strategy for transmission of copies of the content data 6 consists of three parts, a scheduling frequency strategy, a message (e.g. content data 6) weight or importance, and a dispatching strategy (see descriptions of the three parts of the overall scheduling strategy described infra). The transmission scheduler 12 utilizes the scheduling frequency strategy to determine when a copy(s) of the content data 6 should be transmitted to the receiving devices 24. The frequency strategy may vary by content data 6 type and QoS level and is applied to the copy(s) of the content data 6 and therefore each content data type can be easily configured to use different scheduling frequency strategies. The frequency strategy may also use a model (see description of FIG. 2) of the target population (i.e., input data 9) to predict how often copies of the content data 6 should be transmitted during specified time frames in order to reach a specified QoS level. The input data 9 is static and predetermined, but various kinds of feedback data 17 from the target population could be used to update the input data 9 adaptively. The copy of the content data 6 is scheduled for transmission at a requested time according to the frequency strategy and is placed in a priority queue 14. The copy of the content data 6 remains in the priority queue 14 until the dispatcher 16 determines it should be dispatched for transmission to the receiving devices 24. The priority queue 14 uses the dispatching strategy to prioritize the copy of the content data 6 with regards to any other content data that may be scheduled for transmission. The dispatching strategy is a function of a scheduled transmission time versus an actual time and the content data's (e.g., content data 6) importance or weight (see description infra) with regards to any other content data in the priority queue 14 that is scheduled for transmission. The importance or weight may be a function of content data 6 attributes such as, inter alia, category, QoS level, etc. When the copy of the content data 6 reaches the top of the priority queue 14, the dispatcher 16 transmits the copy of the content data 6 over the broadcast medium 20. If an error occurs during transmission, it is logged and the dispatcher 14 attempts to transmit the copy of the content data 6 again. After the copy of the content data 6 is successfully transmitted over the broadcast medium 20, a message history is recorded by the dispatcher 16 and sent back to the transmission scheduler 12 as feedback data 17. The feedback data 17 is used to update the target population model (i.e., input data 9) and predict how many targets (e.g, receiving device 24) received the copy of the content data 6 successfully at the time it was transmitted. The prediction is used to update the current estimated content data saturation level. Based on the current estimated content data level, copies of the content data 6 are resubmitted to the transmission scheduler 12 for later transmission and the aforementioned processes repeats until the content data 6 has reached it's estimated content data 6 saturation level or otherwise determined to no longer be transmitted.

The scheduling frequency strategy and weight or importance are each implemented at the time that a copy of the content data 6 is scheduled for transmission (i.e., in the transmission scheduler 12). The dispatching strategy occurs in real time (i.e., in the dispatcher 16) and returns feedback data 17 to the scheduler for input used for scheduling the next content data 6 transmission.

The scheduling frequency strategy determines when and how often copies of the content data 6 should be scheduled for transmission. The scheduling frequency strategy is applied to the copy(s) of the content data 6 message type can be easily configured to use a completely different strategy. Complex scheduling frequency strategies are possible to implement by isolating a functionality (e.g., even distribution broadcast time strategy as described with reference to FIG. 2). For example, it is possible to construct a scheduling frequency strategy that only broadcasts copies of the content data 6 at certain times of the day or days of the week.

Figure 2:
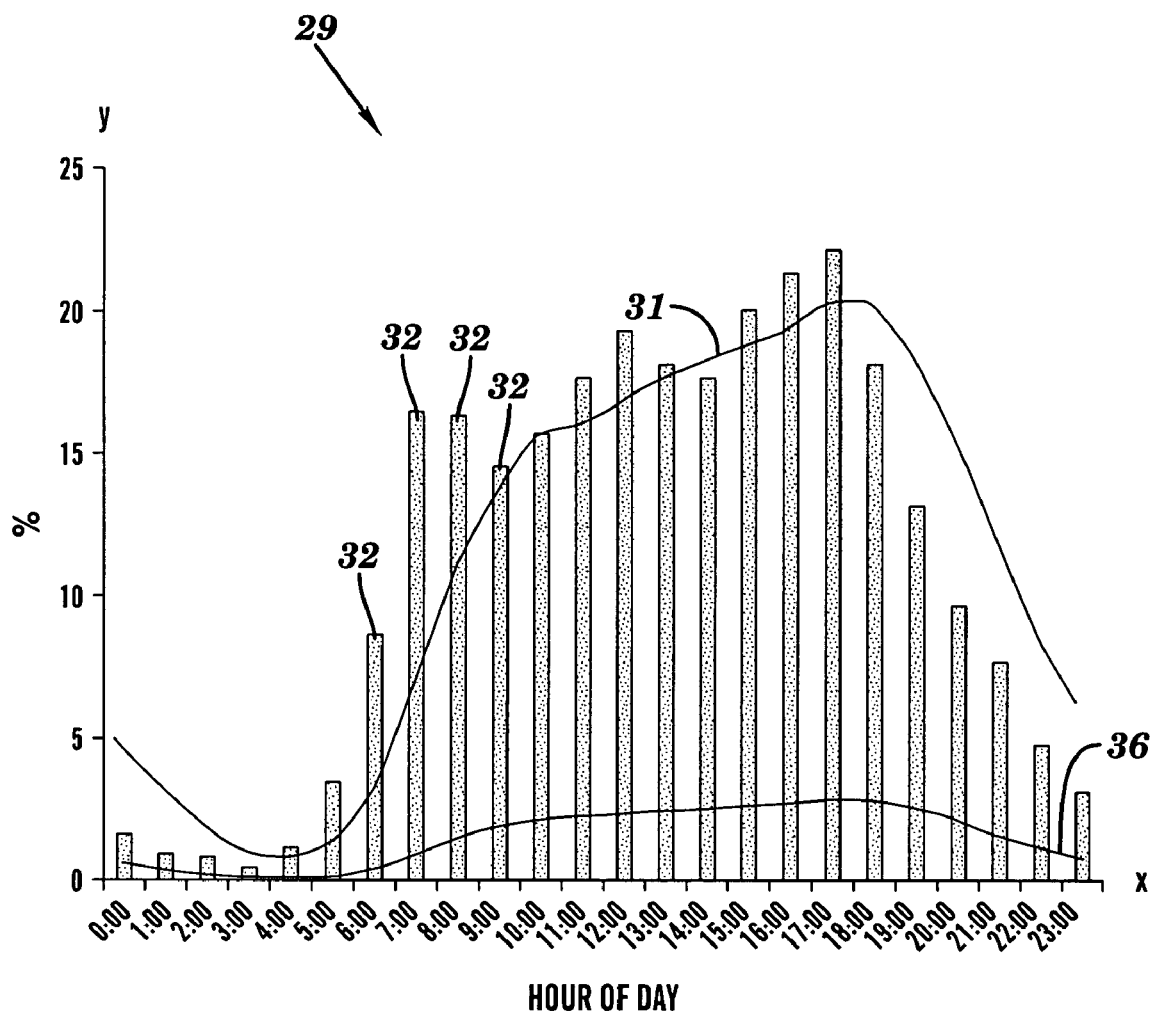
FIG. 2 illustrates a graph of data to be used as the input data in FIG. 1 for implementing the scheduling frequency strategy, in accordance with embodiments of the present invention

FIG. 2 illustrates a graph 29 of data representing the National Household Travel Survey (NHTS) conducted by the U.S. Department of Transportation to be used as an example of developing the input data 9 in FIG. 1 for implementing the scheduling frequency strategy, in accordance with embodiments of the present invention. The National Household Travel Survey (NHTS) is available at http://nhts.ornl.gov/2001/index.shtml. The data comprises daily automobile travel statistics for travel during 2001. In this example the targeted recipients (i.e., through receiving devices 24) for content data 6 transmission (i.e., broadcasted message) are people in traveling automobiles. The Y-axis represents a percentage of vehicles on the road. The X-axis represents hours during the day. The bars 32 each show percentage of vehicles within the U.S. that were on the road during a one hour interval. For example, 22.1% of all vehicles in the U.S. drive at some point during the hours of 5:00 pm and 6:00 pm (i.e., between 17:00 and 18:00), on average. This data pertains to a specific time zone. An average of the four major U.S. time zones is shown as the plot 31. The plot 36 illustrates a percentage of vehicles on the road at a specific time of the day. This is calculated based on the number of vehicles that drove during the hour and the average length of time of a trip. According to the 2001 NHTS survey, the average time for most trips is roughly around 10 minutes. The plot 36 provides a distribution that allows a calculation regarding the effectiveness of a content data 6 transmission. According to the plot 36, 2.8% of all vehicles are on the road at any given time during the rush hour, between 5 pm and 6 pm. Thus, the probability that any given vehicle receives a content data 6 transmission during this time is 2.8% assuming that every vehicle on the road successfully receives the content data 6 transmission. By tracking the time that content data 6 was transmitted, we can also approximate the current content data 6 saturation cumulatively. The content data 6 saturation is the percentage of vehicles that have likely received the content data 6 transmission at least once. This current saturation (Saturation$_{i+1}$) is defined by Equation 1:

$$\text{Saturation}_{i+1} = \text{Saturation}_i + (1 - \text{Saturation}_1) \cdot P \quad \text{Equation 1}$$

P is the percentage of vehicles on the road at the time of the content data 6 transmission. Because two content data 6 transmissions sent 3 seconds apart will likely hit the same vehicles, equation 1 more accurately reflects the content data 6 saturation if the content data 6 transmissions are spread across a larger time period. Given that the average trip time is 10 minutes, this should be used as a guideline for the minimum content data 6 transmission interval. The system 2 may support complex scheduling frequency strategies that can account for any number of statistical and content data 6 attributes. A scheduling frequency strategy may be developed increasing a rate of content data 6 transmission during peak time periods, transmit content data 6 during specific times or days of the week, transmit content data 6 at only preferred times requested by the targeted recipients, etc. Additionally, extremely high saturation rates may be achieved with a relatively low number of content data 6 transmissions by transmitting content data 6 at a random time interval. Based on the plot 36, the average number of vehicles on the road at any given time of the day is 1.6%. To determine the number of content data 6 transmissions required to reach a saturation level Equation 1 (converges to a power series) may be rewritten as Equation 2:

$$\text{Saturation}_N = 1 - (1-P)^N \quad \text{Equation 2:}$$

P is the average number of vehicles on the road at any given moment and N is the number of content data 6 transmissions. If the saturation value is known, the equation needs to be solved for N as Equation 3:

$$N = \log(1 - \text{Saturation}_N) / \log(1 - P) \quad \text{Equation 3:}$$

Setting P=1.6% and Saturation$_N$=90%:

$$N = \log(1-0.9)/\log(1-0.016) = 142.7$$

Therefore, 143 content data 6 transmissions are required to reach 90% of all vehicles if 1.6% of all vehicles are on the road at any given moment. Using different values for Saturation$_N$ generates the following Table 1:

TABLE 1

| Saturation$_N$ | Number of Messages | Cars Hit | Cars Missed |
| --- | --- | --- | --- |
| 90% | 143 | 900,000 | 100,000 |
| 92% | 157 | 920,000 | 80,000 |
| 95% | 186 | 950,000 | 50,000 |
| 99% | 286 | 990,000 | 10,000 |
| 99.5% | 329 | 995,000 | 5,000 |
| 99.9% | 428 | 999,000 | 1,000 |
| 99.99% | 571 | 999,900 | 100 |

The scheduling frequency strategy defined by table 1 determines a content data 6 transmission frequency based on the target saturation rate over a given time interval and the average number of vehicles on the road at any given time. This time interval, the estimated average number of vehicles on the road at any time (P), and the target saturation rate will be configurable parameters that can easily be tuned based on experimentation and testing. The time interval can be configured for QoS levels. For example, a content data 6 transmission comprising a high priority may want to achieve 99% saturation every 3 days while a content data 6 transmission comprising a medium priority may only need to achieve 99% every 3 weeks. The following example demonstrates how the next content data 6 transmission time is determined. For this example, assume that a content data 6 transmission should achieve 99% saturation weekly and that the value for P is conservatively set at 0.008 (0.8%): Upon initialization a target content data 6 transmission frequency will be calculated. The saturation rate is used to determine the number of content data 6 transmissions sent to achieve the target saturation rate. In this case P=0.008 gives us 575 messages to achieve 99%. The time interval is used to find the average content data 6 transmission frequency to meet the target. In this case, 575 messages must be sent every week. Thus, the average content data 6 transmission frequency is around 17 minutes and 30 seconds. When the content data 6 is scheduled for transmission, the next transmission time is calculated. A random time interval is found such that the average content data 6 transmission frequency is 17.5 minutes. Using a pseudo random number generator giving a random value (RAND) between 0 and 1, a random value multiplied by twice the average content data 6 transmission frequency gives the next interval. Interval=RAND·2·Average Frequency. If the random value is 0.632 then the random interval is 0.632·2·17.5=22.12 minutes. The random interval is then added to the time of the last message transmission. The content data 6 should be scheduled for its next transmission at this time. If the message was last sent at 5:30:35, then next transmission should be at 5:52:55. The current implementation of this scheduling frequency strategy provides the ability to drop the target time interval after an initial saturation. For example, content data 6 could be scheduled to achieve 99% saturation in its first week, but afterwards drop to 99% every month. For example, the lower secondary frequency could still accommodate newly purchased vehicles and any other vehicles missed during the initial transmission period.

Figure 3A:
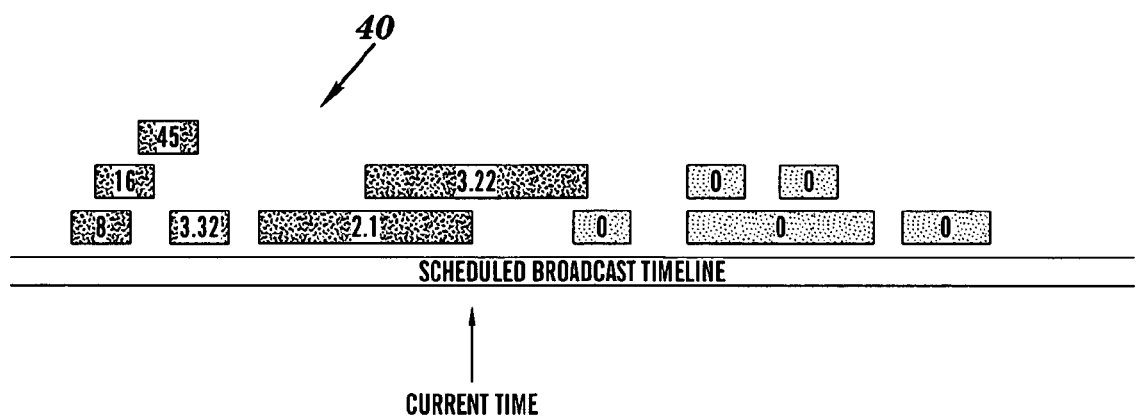
FIGS. 3A and 3B illustrate diagrams of the content data weight or importance applied the dispatching strategy for the system 1 of FIG. 1, in accordance with embodiments of the present invention.
Figure 3B:
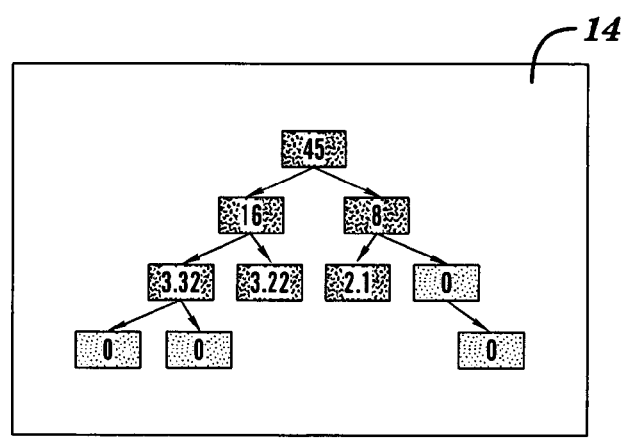

FIGS. 3A and 3B illustrate diagrams of the content data 6 weight or importance applied the dispatching strategy for the system 1 of FIG. 1, in accordance with embodiments of the present invention. The weighting function is an isolated component in the architecture and can use any message attributes as variables. Different content data 6 categories can be configured to use different weighting strategies. The weight represents the basic priority (high, low, or medium) of the message. The weighting strategy is used by the dispatching strategy to determine which content data (e.g., content data 6) to transmit when there are overlaps or conflicts in scheduled transmission times. There are four attributes determined to be important when calculating a content data weight. The four attributes are the category, QoS level, the estimated current saturation level, and when applicable, an activation date. Initially the weighting function will account for these four variables and be defined as Equation 4:

$$\text{WEIGHT} = \text{Category} \cdot \text{QoS Level} + \alpha \cdot (1 - \text{Saturation}_i) + \beta \cdot \text{NormalDist}(x, \mu, \sigma) \quad \text{Equation 4:}$$

The first term in the equation is the content data 6 category. This is a fixed positive value and allows certain content data types to take priority over others. The second term in the equation is the service level. The service level is a fixed positive value corresponding to the QoS levels, (high, low, or medium). The third term in the equation increases the weight of content data early in their initial content data saturation cycle. As the estimated saturation level approaches one, this term approaches zero, becoming less and less significant. The coefficient will be configurable and refined through experimentation. This coefficient helps to normalize these terms. The last term in the equation increases the weight of a content data as the activation date approaches and then decreases as the activation date passes. The normal distribution or bell curve is used to achieve this behavior. The mean ($\mu$) is the activation date. The variance, sigma ($\sigma$), will affect how quickly the weight changes as the activation date approaches. X is the difference of the current date minus the activation date. The normal distribution approaches 1 as x→0, and approaches 0 as x→+/−∞. The coefficient, $\beta$, is a scalar used to adjust the term relative to others. This scalar will be configurable and refined through experimentation. Content data weight is calculated each time the content data is scheduled and remains constant until the content data is transmitted and rescheduled for transmission. This is important and ensures that the overall priority of the content data in the priority queue increase at a constant rate. This is required to avoid race conditions. If the weight of a content data is allowed to change faster than other content data, it would be possible to continually be transmit again and again ahead of other content data.

The dispatching strategy determines the overall priority of content data in the priority queue 14. The primary goal of the dispatching strategy is to dispatch content data as close to a scheduled time as is possible. If there are multiple content data that are due to be transmitted, the dispatcher 16 should transmit the content with the highest priority. If the scheduled time is greater than the current time, (i.e. the content data is scheduled to be transmitted in the future, the content data priority is zero.

FIG. 3A illustrates a schedule with six content data 40 past due. The content data with the highest priority, in this case 45, will be chosen to be transmitted. The overall scheduled content data priority is a function of the content data weight, and the delta between scheduled time and the current time, defined as Equation 5:

PRIORITY=WEIGHT+$\alpha \cdot$(CurrentDate−Scheduled-Date)    Equation 5:

The CurrentDate≧Scheduled Date in milliseconds; otherwise, PRIORITY=0. $\alpha$ is a coefficient initially equal to 1 and will be configurable and refined through experimentation. This coefficient helps to normalize this term.

FIG. 3B illustrates the priority queue 14 comprising a heap implementation where the object (content data) with the highest priority (45) bubbles up to the top of the priority queue 14. If the content data at the top of the queue is zero it will immediately be pushed back onto the queue without being transmitted or rescheduled. Adding and removing objects (content data) to the priority queue requires a heap sort and is O(n ln(n)) time in the worst case (but turns out to be linear on average). The next scheduled time and weight are calculated only as the content data is being added to the priority queue 14. Thus, the overall priority of each content data increases linearly once the content data becomes "overdue". This guarantees that every content data scheduled will eventually be delivered and race conditions are avoided. In those cases where there is no penalty or cost for retransmission, it may be desirable to continuously use all of available bandwidth for transmission since there is no penalty for transmitting a content data more often than scheduled. In this case, if the content data at the top of the priority queue 14 has a priority of zero (i.e. no content data is due to be transmitted) then the dispatcher 16 will implement a secondary strategy. This secondary strategy will simply cycle through the scheduled content data in a round robin fashion. Each content data will remain scheduled according to its next scheduled time even if it is transmitted earlier than requested. It is assumed that the scheduling frequency strategy has scheduled enough transmissions to meet its goals, and that the strategy may be requesting a specific time for reasons unknown to the dispatcher 14. These "extra" transmissions due to this secondary strategy simply help improve actual saturation rates beyond the necessary scheduling.

Figure 4:
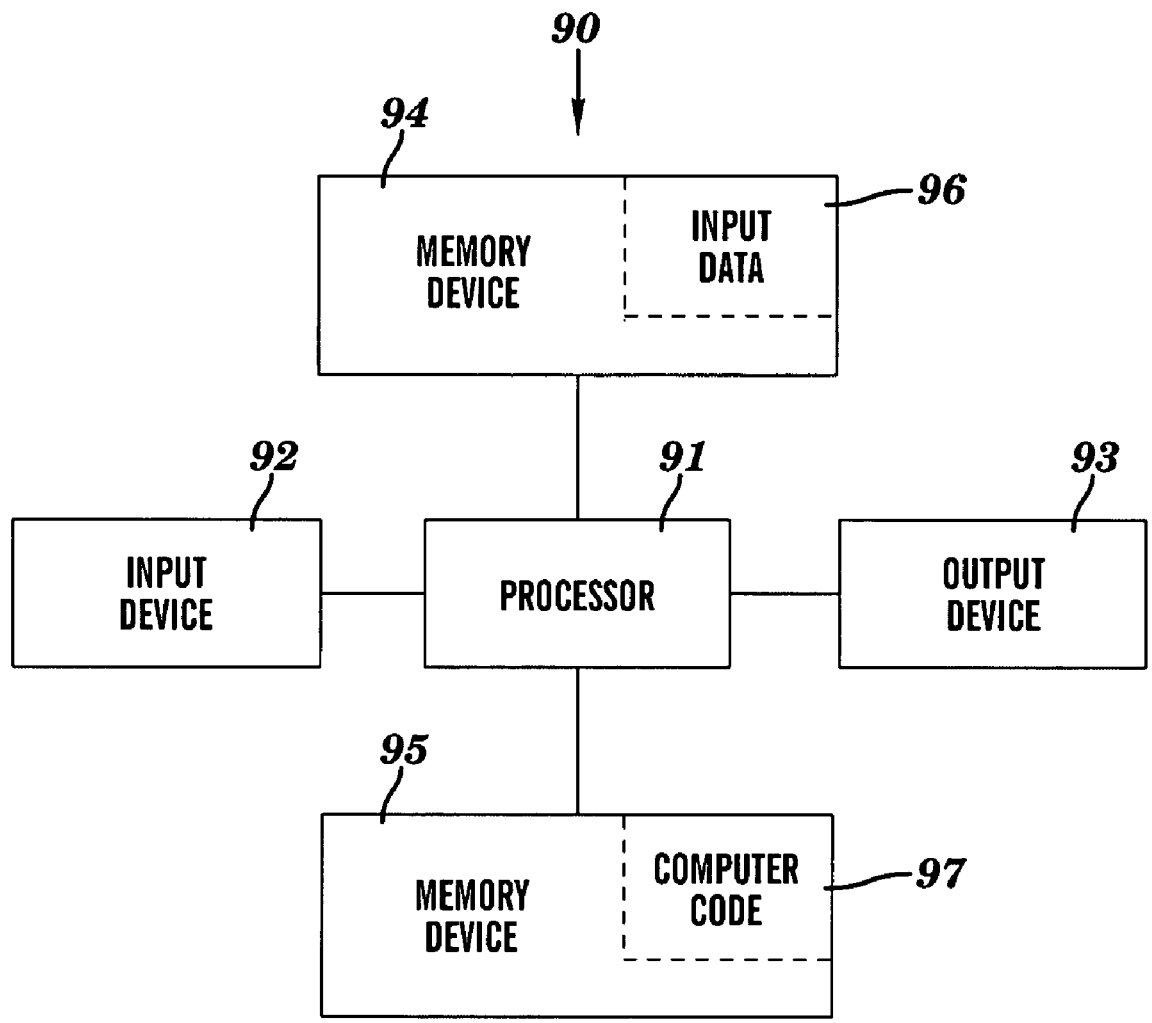
FIG. 4 illustrates a computer system used for scheduling data for transmission, in accordance with embodiments of the present invention.

FIG. 4 illustrates a computer system 90 used for scheduling content data 6 for transmission of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) for scheduling the content data 6 of the present invention for transmission. The processor 91 executes the computer code 97. The memory device 94 includes input data 9. The memory device 94 memory device 95, and the processor 91 may relate to the computing device 1 of FIG. 1. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices. As another example, the hardware and software environments of FIGS. 1-3, discussed supra, may be utilized.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system, comprising:
   data generating means for generating data comprising content data and metadata relating to the content data;
   developing means for developing a set of input data; and
   a scheduling system comprising:
   a database internal to said scheduling system;
   message receipt means for receiving said data from said data generating means, passing said content data to said database, and generating a notification message indicating that said content data has been received by said database;
   transmission scheduling means for receiving said notification message from said message receipt means and producing a continuously updating schedule for transmission of the content data based on the metadata and the set of input data;
   priority queue means for retrieving copies of the content data from said database and storing said copies; and
   dispatching means for periodically retrieving said copies from said priority queue means and transmitting said copies to receiving devices based on said continuously updating schedule, said receiving devices and said data generating means external to said scheduling system, said continuously updating schedule configured to be updated based on feedback data generated by the dispatching means each time a copy of said copies is transmitted by the dispatching means.

2. The system of claim 1, wherein the dispatching means is adapted to periodically transmit said copies at specified times based on said continuously updating schedule.

3. The system of claim 1, wherein the dispatching means is adapted to periodically transmit said copies during a specified time frame.

4. The system of claim 1, wherein the metadata comprises priority level information for transmission of said copies.

5. The system of claim 1, wherein the set of input data comprises target data regarding a target receiving party for said copies.

6. The system of claim 5, wherein the scheduler means is adapted to use the target data to determine a percentage of said target receiving party that will successfully receive a copy of said copies.

7. The system of claim 6, wherein the transmission scheduling means is further adapted to meet a quality of service for said content data requested in said metadata.

8. The system of claim 1, wherein the content data is selected from the group consisting of audio data, video data, and a software object.

9. The system of claim 1, wherein the set of input data comprises a model of a target population that uses said receiving devices.

10. The system of claim 1, wherein said continuously updating schedule comprises a scheduling frequency strategy that specifies an increasing rate of said transmitting said copies to said receiving devices during specified peak time periods.

11. The system of claim 1, wherein said continuously updating schedule comprises a scheduling frequency strategy that specifies only transmitting said copies to said receiving devices during time periods specified by users of said receiving devices.

12. A method, comprising:
   providing a data generating means, a developing means, and a scheduling system, said scheduling system comprising a database internal to said scheduling system, a message receipt means, a transmission scheduling means, a priority queue means, and a dispatching means;
   generating, by said data generating means, data comprising content data and metadata relating to the content data;
   developing, by said developing means, a set of input data; and
   receiving, by said message receipt means from said data generating means, said data;
   passing, by said message receipt means, said content data to said database;
   generating, by said message receipt means, a notification message indicating that said content data has been received by said database;
   receiving, by said transmission scheduling means, said notification message from said message receipt means;
   producing, by said transmission scheduling means, a continuously updating schedule for transmission of the content data based on the metadata and the set of input data;
   retrieving and storing, by said priority queue means, copies of the content data from said database;
   periodically retrieving, by said dispatching means, said copies from said priority queue means;
   transmitting, by said dispatching means, said copies to receiving devices based on said continuously updating schedule, said receiving devices and said data generating means external to said scheduling system;
   generating, by said dispatching means, feedback data each time a copy of said copies is transmitted; and
   continuously updating, by said transmission scheduling means, said continuously updating schedule based on said feedback data.

13. The method of claim 12, further comprising periodically transmitting by the dispatching means, said copies at specified times.

14. The method of claim 12, further comprising periodically transmitting by the dispatching means, said copies during a specified time frame.

15. The method of claim 12, wherein the metadata comprises priority level information for transmission of said copies.

16. The method of claim 12, wherein the set of input data comprises target data regarding a target receiving party for said copies.

17. The method of claim 16, further comprising determining by the scheduling means from said target data, a percentage of said target receiving party that will successfully receive a copy of said copies.

18. The system of claim 17, meeting by the scheduler means, a quality of service for said content data requested in said metadata.

19. The method of claim 12, wherein the content data is selected from the group consisting of audio data, video data, and a software object.

20. The method of claim 12, wherein the set of input data comprises a model of a target population that uses said receiving devices.

21. The method of claim 12, wherein said continuously updating schedule comprises a scheduling frequency strategy that specifies an increasing rate of said transmitting said copies to said receiving devices during specified peak time periods.

22. The method of claim 11, wherein said continuously updating schedule comprises a scheduling frequency strategy that specifies only transmitting said copies to said receiving devices during time periods specified by users of said receiving devices.

23. A computer program product, comprising a computer readable medium having a computer readable program code embodied therein, said computer readable program code adapted to implement a scheduling method within a system, said system comprising a data generating means, a developing means, and a scheduling system, said scheduling system comprising a database internal to said scheduling system, a message receipt means, a transmission scheduling means, a priority queue means, and a dispatching means, said method comprising;

generating, by said data generating means, data comprising content data and metadata relating to the content data;

developing, by said developing means, a set of input data; and receiving, by said message receipt means from said data generating means, said data;

passing, by said message receipt means, said content data to said database;

generating, by said message receipt means, a notification message indicating that said content data has been received by said database;

receiving, by said transmission scheduling means, said notification message from said message receipt means;

producing, by said transmission scheduling means, a continuously updating schedule for transmission of the content data based on the metadata and the set of input data;

retrieving and storing, by said priority queue means, copies of the content data from said database;

periodically retrieving, by said dispatching means, said copies from said priority queue means;

transmitting, by said dispatching means, said copies to receiving devices based on said continuously updating schedule, said receiving devices and said data generating means external to said scheduling system;

generating, by said dispatching means, feedback data each time a copy of said copies is transmitted; and continuously updating, by said transmission scheduling means, said continuously updating schedule based on said feedback data.

24. A computer system comprising a processor and a computer readable memory unit coupled to the processor, said memory unit containing instructions that when executed by the processor implement a method for scheduling transmission of content data within a system, said system comprising a data generating means, a developing means, and a scheduling system, said scheduling system comprising a database internal to said scheduling system, a message receipt means, a transmission scheduling means, a priority queue means, and a dispatching means, said method comprising the computer implemented steps of:

generating, by said data generating means, data comprising content data and metadata relating to the content data;

developing, by said developing means, a set of input data; and receiving, by said message receipt means from said data generating means, said data;

passing, by said message receipt means, said content data to said database;

generating, by said message receipt means, a notification message indicating that said content data has been received by said database;

receiving, by said transmission scheduling means, said notification message from said message receipt means;

producing, by said transmission scheduling means, a continuously updating schedule for transmission of the content data based on the metadata and the set of input data;

retrieving and storing, by said priority queue means, copies of the content data from said database;

periodically retrieving, by said dispatching means, said copies from said priority queue means;

transmitting, by said dispatching means, said copies to receiving devices based on said continuously updating schedule, said receiving devices and said data generating means external to said scheduling system;

generating, by said dispatching means, feedback data each time a copy of said copies is transmitted; and continuously updating, by said transmission scheduling means, said continuously updating schedule based on said feedback data.

* * * * *